C. J. HIGGINS.

Assignor to HADLEY BROTHERS & KANE.

BLACKBOARD RUBBERS.

No. 7,400. Reissued Nov. 28, 1876.

Witnesses:
Will H. Dodge
Donn F. Twitchell.

Inventor:
C. J. Higgins.
by Dodgerton
Attys.

THE GRAPHIC CO. N.Y.

UNITED STATES PATENT OFFICE.

CHARLES J. HIGGINS, OF INDIANAPOLIS, INDIANA, ASSIGNOR TO HADLEY BROTHERS & KANE.

IMPROVEMENT IN BLACKBOARD-RUBBERS.

Specification forming part of Letters Patent No. 148,698, dated March 17, 1874; reissue No. 7,400, dated November 28, 1876; application filed November 11, 1876.

*To all whom it may concern:*

Be it known that I, CHARLES J. HIGGINS, of Indianapolis, in the county of Marion and State of Indiana, have invented certain new and useful Improvements in Blackboard-Rubbers; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

The object of this invention is to provide an eraser or rubber for removing marks from blackboards or slates, that will be simple, cheap, and durable; and to this end the invention consists, first, in constructing the body of two blocks, so formed that one will slide upon the other, and clasp the cloth or rubbing material; and second, in constructing the cloth or rubbing material in the form of an endless belt, so that it can be adjusted to present a fresh rubbing-surface when required.

Figure 1:
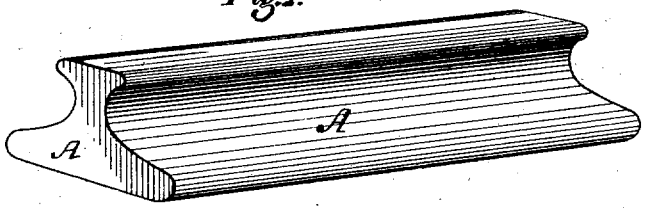
Figure 2:
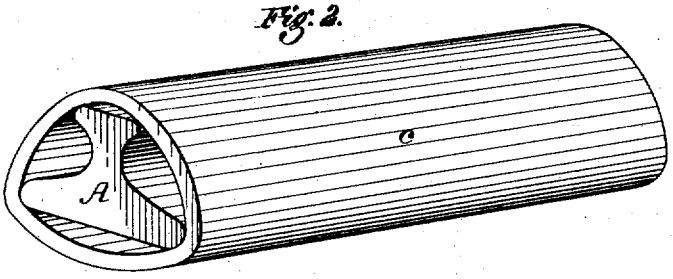
Figure 3:
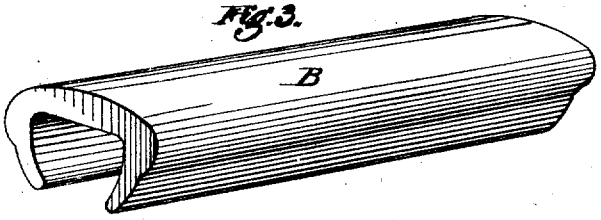

Figures 1 and 3 are perspective of the two blocks detached. Fig. 2 is a similar view of one of the blocks, with the endless cloth placed loosely thereon, and Fig. 4 represents the eraser complete.

To construct an eraser on my plan, I provide two blocks, A and B, which may be of wood or any suitable material, one of said blocks being provided with a longitudinal groove, and the other with a correspondingly-shaped rib or projection, this groove and rib being of such form that they will be locked together by simply shoving the grooved block lengthwise upon the rib or projection of the other, as represented in the drawings.

The block should be fitted together sufficiently loose to permit the cloth C to be inserted between the adjoining surfaces of the blocks, so that when the blocks are united the cloth will be clamped between them, and thus be held fast.

Figure 4:
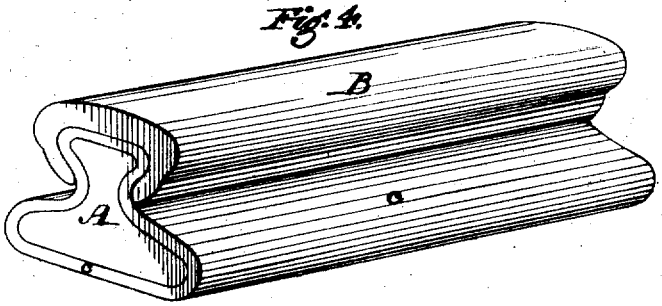

The face of the lower block, A, is made flat, or nearly so, with its edges rounded off, as shown in Figs. 1 and 4, and of any desired width.

The upper block, B, is preferably made concave on its sides longitudinally, so as to be easily grasped and held by the hand.

I do not confine myself to the particular forms of groove and projection here shown, as they may be made in other suitable forms, the only requisite being that they shall interlock and hold the parts and the cloth together or in place.

The rubbing material may be of cloth or any soft fibrous substance, pieces of carpet being generally used. This I prefer to make in the form of an endless band, as shown in Fig. 2, so that when the lower surface is worn or soiled it can be adjusted so as to present a fresh rubbing-surface. This is readily accomplished by separating the blocks, turning the cloth C partly around, and then uniting the blocks again.

While I prefer to make the cloth in the form of an endless band, for the reason stated, it is obvious that its edges need not be united, and that it need not cover the rib or projection, it only being necessary that it shall be securely clasped between the blocks. It is obvious that when the cloth C has become worn and soiled, it can be readily detached and another substituted.

By this method of construction I am enabled to produce a very simple, cheap, and efficient eraser, especially adapted for use in schools.

When intended for use on slates, they will, of course, be made considerably smaller than for blackboards.

Having thus described my invention, what I claim is—

1. A holder for blackboard-rubbers, composed of two blocks, A and B, one provided with a groove, and the other with a rib or projection constructed to slide therein, and thus clamp or fasten the cloth C or other soft material to the holder, substantially as set forth.

2. The combination of the blocks A and B with the rubbing material C, said blocks being constructed to operate substantially as described, whereby one is locked to the other, and made to clamp or fasten the cloth C in place.

3. The combination of the blocks A and B with the endless band C, whereby the rubbing-surface of the band may be adjusted or changed at will, substantially as described.

CHARLES J. HIGGINS.

Witnesses:
P. T. DODGE,
WILL W. DODGE.